(12) United States Patent
Michaels (10) Patent No.: US 6,528,913 B1
(45) Date of Patent: Mar. 4, 2003

(54) ELECTRIC DEVICE GROUNDING SYSTEM

(75) Inventor: Paul G. Michaels, Arnold, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/444,419

(22) Filed: Nov. 19, 1999

(51) Int. Cl.[7] .......................... H02K 11/00; H01F 27/04
(52) U.S. Cl. ........................................ 310/71; 336/107
(58) Field of Search ................................ 310/68 R, 71, 310/66; 336/107, 192

(56) References Cited

U.S. PATENT DOCUMENTS

| | | | | |
|---|---|---|---|---|
| 4,181,393 A | * | 1/1980 | Lill | 439/402 |
| 4,544,856 A | * | 10/1985 | King | 310/71 |
| 4,642,885 A | * | 2/1987 | King | 29/596 |
| 4,656,378 A | * | 4/1987 | Atherton et al. | 310/71 |
| 5,782,652 A | * | 7/1998 | Feher et al. | 310/71 |
| 5,861,689 A | * | 1/1999 | Snider et al. | 310/71 |

FOREIGN PATENT DOCUMENTS

JP        11289702        10/1999

* cited by examiner

Primary Examiner—Tran Nguyen
Assistant Examiner—Guillermo Perez
(74) Attorney, Agent, or Firm—Thompson Coburn LLP (57) ABSTRACT

A terminal block constructed of an insulator material receives a ground connector constructed of a conductive material where the ground connector has a plug projecting from the terminal block at one end and a tab with a fastener hole at its opposite end. Attachment of the terminal block to a stator of a dynamoelectric device simultaneously positions the tab of the ground connector with the tab hole aligned with a fastener hole of the stator and a fastener hole of an end plate of the device. Assembling the stator and end plate together by a threaded fastener also secures the tab of the ground connector between the stator and end plate.

17 Claims, 6 Drawing Sheets

ELECTRIC DEVICE GROUNDING SYSTEM

BACKGROUND OF THE INVENTION (1) Field of the Invention

The present invention pertains to an apparatus employed in grounding the stator and end plates of a dynamoelectric device. In particular, the invention pertains to a terminal block constructed of an electrically insulating material and a ground connector constructed of a electrically conductive material that is installed in the terminal block, where the ground connector has a plug projecting from the terminal block at one end and a tab with a fastener hole at its opposite end. Attachment of the terminal block to the stator of the device simultaneously positions the tab of the ground connector with the tab hole aligned with fastener holes of the stator and at least one end plate of the device where assembling the stator and end plate together by a threaded fastener also secures the tab of the ground connector between the stator and end plate.

(2) Description of the Related Art

A dynamoelectric device is often constructed with a ground system that directs electrical energy away from the device in the case of an electric malfunction in the device that could shock a person touching the device or its supporting equipment. In a typical electrical device the ground is attached to an external frame or housing of the device. This insures that in the event of a power supply wire making contact directly or indirectly with the frame or housing of the device that is accessible to a person using the device, the electric energy can be directed away from the housing of the device. By directing the electric energy to a ground a "short circuit" condition is created where the electric energy is directed away from the device along the path of least resistance, thus preventing any person contacting the device from receiving an electrical shock. The high current flow through the ground in situations such as this will often cause self-actuating protective switches in the device to open the circuit and stop electrical current flow to the device. This protects both the device from a high current surge and also protects people who may otherwise contact the malfunctioning device and receive a shock.

In electrical devices such as electric motors installed in household appliances, the external frame of the device is required to be provided with a ground connection to protect persons using the appliance if an electrical malfunction occurs. The ground connection is often directed to a water pipe of the home or the ground pole in a three prong plug electrical socket. Because the electric motor is typically mounted directly to the metallic structure of the appliance, the ground connection is directly to the frame of the motor. In the event of an electric malfunction in the motor, the electric current is directed to the grounding system and people using the appliance are protected from receiving an electrical shock. Grounding of electrical devices in this manner is common. For the purpose of explaining the subject matter of the invention, the example of a small electric motor is used. However, it should be understood that the example is illustrative only and that the grounding system of the invention may be employed in many different types of electrical devices and is not intended to be limited to use with only electric motors.

Figure 1:
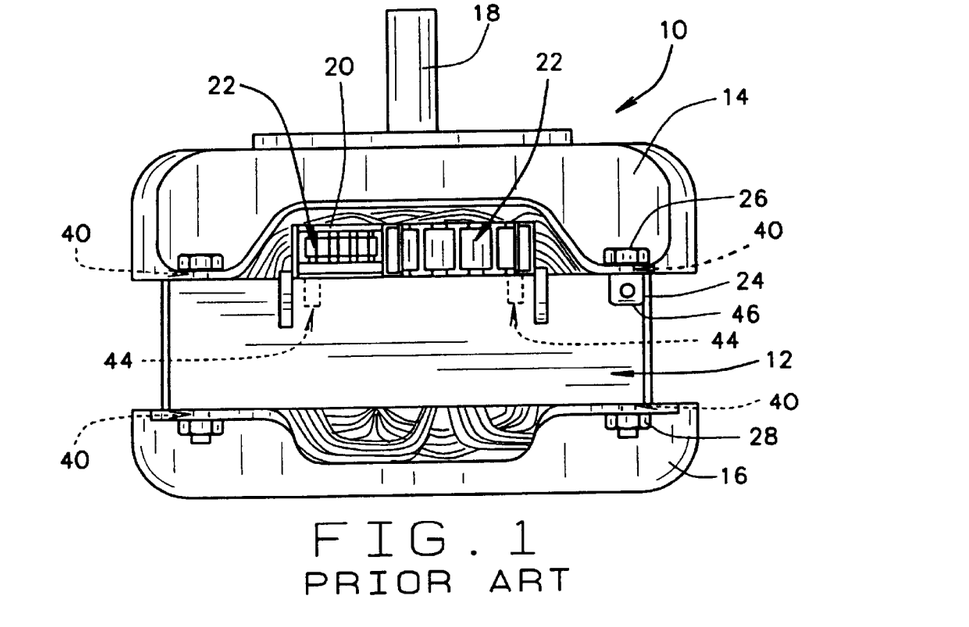
FIG. 1 is a side elevation view of a prior art electrical device, in this case a prior art electric motor.

FIG. 1 is a side elevation view of a typical electric motor 10. The motor is basically comprised of a stator assembly 12, a pair of end plates 14, 16 secured to opposite end surfaces of the stator assembly 12, and a rotor (not shown) mounted on a rotor shaft 18 which in turn is mounted for rotation in a pair of bearings (not shown) mounted in the two end plates 14, 16. A terminal block 20 constructed of an insulating material is mounted on the stator assembly 12. The terminal block 20 has a series of electrical plugs 22 projecting from the block that are connected to the wiring of the stator assembly 12 and provide external connections to the circuitry of the appliance or other device with which the motor is used. The motor also comprises a ground connector 24 that is easily accessible for connection to a conductor used to connect the motor to an external ground, such as the earlier example of the water pipe. The ground connector 24 is secured and grounded to both the stator assembly 12 and one of the two end plates 14 of the motor by the bolt 26 and nut 28 threaded fasteners that secure the end plates 14, 16 to the opposite end surfaces of the stator assembly 12.

Figure 2:
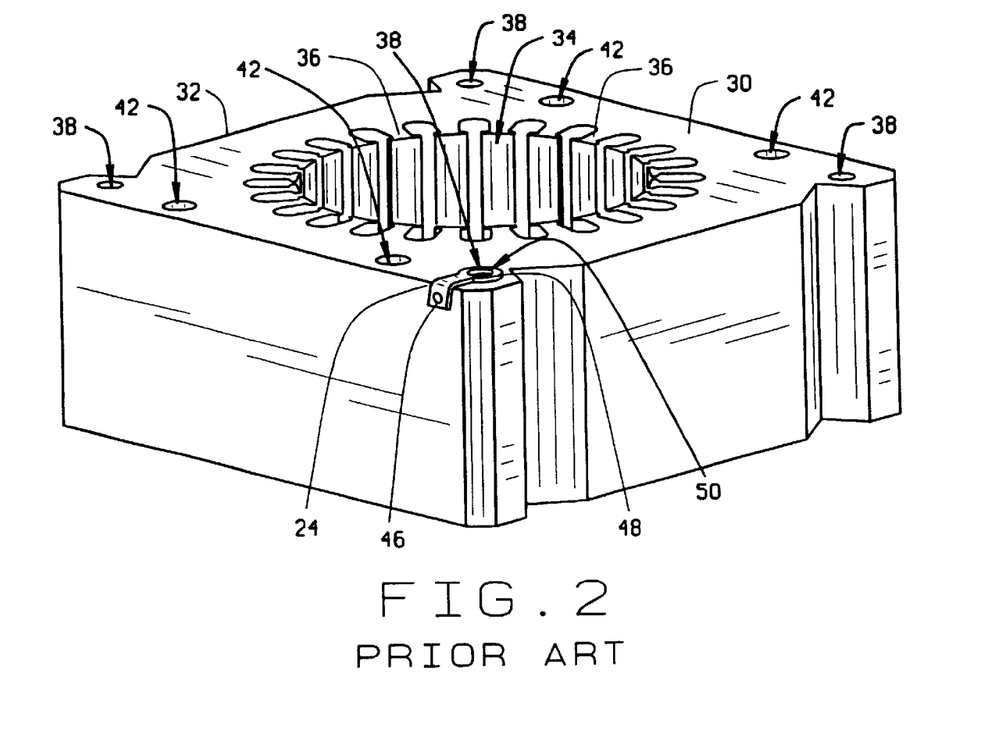
FIG. 2 is a view of the stator disassembled from the motor of FIG. 1.

FIG. 2 shows the stator 30 removed from the stator assembly 12 of the motor shown in FIG. 1. The stator 30 in this example is comprised of a stack of laminate plates that each have the same, generally square peripheral edge 32. The peripheral edges 32 of each of the plates in the stator stack forms a portion of the motor frame or exterior surface of the motor. The stator has a generally cylindrical center bore 34 surrounded by a plurality of stator poles 36. Four fastener holes 38 pass entirely through the stator stack adjacent the four corners of the stator. The stator fastener holes 38 are positioned on the stator so that they will align with four fastener holes 40 in each of the end plates 14, 16 when the end plates are positioned on the opposite end surfaces of the stator. The stator also has two pairs of terminal block mounting post holes 42 adjacent opposite ends of the stator. The mounting post holes 42 are provided in pairs on opposite sides of the stator to enable a single terminal block to be mounted on either side of the stator or a pair of terminal blocks mounted on the opposite sides of the stator if needed. The mounting post holes 42 are dimensioned to receive mounting posts 44 of the terminal block 20 and to hold the terminal block securely against one of the end surfaces of the stator adjacent the post holes. Typically, the ground connector 24 is also mounted on the end surface of the stator adjacent the terminal block 20. This provides all of the electrical connections to the motor on one side of the motor. As seen in FIG. 2, the ground connector 24 has a plug 46 at one end that projects from a grounding tab 48. The tab 48 has a hole 50 therethrough that is dimensioned to be the same size as the stator fastener holes 38 and the end plate fastener holes 40.

Generally describing the assembly of a motor such as that shown in FIG. 1 and the attachment of the prior art ground connector 24 to the motor, after the stator poles 36 are wound, the winding connections from the stator poles and other circuitry of the motor are made to the conductor plugs 22 of the terminal block 20. The terminal block 20 is then mounted on the end surface of the stator assembly 12 by inserting its posts 44 into the mounting post holes 42 of the stator. The rotor assembly is then inserted into the stator bore. The rotor is supported in the stator bore by inserting the opposite ends of the rotor shaft 18 into bearing assemblies mounted into the two end plates 14, 16 as the end plates are assembled over the opposite end surfaces of the stator assembly 12.

In assembling the end plates 14, 16 to the opposite end surfaces of the stator assembly 12, the stator fastener holes 38 are aligned with end plate fastener holes 40 provided in each of the end plates. The end plates 14, 16 are secured to the opposite end surfaces of the stator assembly 12 by bolts 26 inserted through the aligned fastener holes of the stator and the end plates and by the nuts 28 screw threaded on the projecting ends of the bolts. However, before the bolts 26 are inserted through the aligned holes of the end plates and the stator assembly, the ground connector 24 is first positioned between the stator assembly and one of the end plates in its position shown in FIG. 1. The ground connector tab 48 is inserted between the stator 12 and the one end plate 14 with its tab hole 50 aligned with a fastener hole 38 of the stator and a fastener hole 40 of the end plate. The bolts 26 are then inserted through the aligned holes and the nuts 28 are screw threaded on the projecting ends of the bolts and tightened down.

The installation of the prior art ground connector 24 requires the manual positioning of the connector tab 48 with the tab hole 50 coaxially aligned with one of the stator fastener hole 38 while also manually positioning the two end plates 14, 16 on the opposite end surfaces of the stator and inserting a fastener bolt 26 through the aligned holes of the end plates, the stator and the ground connector tab. The positioning of these components while aligning the hole of the ground connector tab with the stator fastener hole and the end plate fastener hole before inserting the bolt through the aligned holes is both time consuming and cumbersome for the motor assembler.

SUMMARY OF THE INVENTION

The disadvantages in the prior art motor discussed above could be overcome by a ground connector that could be installed in the terminal block. The terminal block would securely hold the ground connector relative to the terminal block and would position the tab hole of the ground connector over a stator fastener hole when the terminal block is attached to the stator. This would eliminate the need for the motor assembler to hold the ground connector tab in position while securing the two end plates to the opposite end surfaces of the stator with the bolt and nut fastener, thus greatly simplifying the assembly of the electrical device and permitting automated assembly of the device.

The present invention provides a grounding system for an electrical device where a ground connector is securely held by a terminal block of the device and the ground connector is properly positioned relative to other component parts of the electrical device for making a grounding connection with those other component parts when the terminal block is assembled to one of the component parts. The invention is basically comprised of a modified terminal block and a ground connector that is designed to be assembled to the terminal block and securely held by the terminal block.

The terminal block of the invention is, for the most part, similar to prior art terminal blocks in that it is constructed of an electrically insulating material and includes a plurality of plug sockets that securely hold electrically conducting plugs of the electrical device. The terminal block is assembled to a side of the electrical device where it positions the conductive plugs where they can be easily connected to mating receptacles of a separate electrical connector that is attached to the terminal block. The terminal block of the invention differs from prior art terminal blocks in that it is provided with a socket designed to received and securely hold the ground connector of the invention.

The ground connector socket extends from a back surface of the terminal block to its front surface and is positioned on the terminal block in line with the other plug sockets of the terminal block and adjacent one side of the terminal block. The ground connector socket has a cross-section configuration that resembles two diametrically opposite quarter circles. A recessed slot intersects the ground connector socket at the back surface of the terminal block.

The ground connector is formed of a single monolithic piece of electrically conductive material. The ground connector has a length with a ground plug at one end and a connecting tab at its opposite end with a span of the ground connector connecting the ground plug and the tab. The tab is flat and has a hole passing therethrough for receipt of a threaded fastener of the electrical device. The tab projects from one end of the span of the ground connector and is positioned perpendicular to the span of the ground connector. The plug is also flat and projects from an end of the connector span opposite the tab. The plug has a series of barbs adjacent its connection to the span. The plug projects perpendicularly from the span and both the plug and the tab are positioned in parallel, horizontal planes although not in the same horizontal plane.

The plug of the ground connector is inserted into the terminal block ground connector socket from the back of the terminal block. However, because the mounting posts of the terminal block are also positioned at the back of the terminal block, the ground connector plug cannot be inserted directly into the ground plug socket of the terminal block due to the length of the span connecting the ground connector plug to the tab. The ground connector plug is first inserted into the ground connector socket of the terminal block from the back of the terminal block with the span of the ground connector positioned generally parallel with the adjacent mounting post of the terminal block. The ground connector plug is inserted a sufficient distance into the ground connector socket of the terminal block until the span of the ground connector is positioned generally between the back of the terminal block and the adjacent mounting post. In this position of the ground connector it can be rotated 90° causing the span of the ground connector to be positioned between the back of the terminal block and the adjacent mounting post of the terminal block. Once in this position the ground connector plug is inserted to its full extent into the ground connector socket of the terminal block. The ground connector plug barbs are inserted into the recessed slot in the back of the terminal block as the ground connector plug is inserted completely into the ground connector socket of the terminal block. The barbs engage in the material of the terminal block as they are inserted into the recessed slot, thereby securely holding the ground connector to the terminal block.

With the ground connector plug completely inserted into the ground connector socket of the terminal block and with the barbs of the plug engaging in the material of the terminal block slot, the span extends across the back of the terminal block between the back of the terminal block and the mounting plug of the terminal block to the tab which is positioned by the span to one side of the terminal block. With this positioning of the tab by the span, when the terminal block is attached to the stator by inserting the terminal block mounting posts into the post holes of the stator, the span of the ground connector positions the tab over an end surface of the stator with the tab hole aligned coaxially with a fastener hole of the stator. In this position of the tab it provides a ground connection between the stator and an end plate of the electrical device that is attached to the surface of the stator the tab overlaps. The threaded fasteners passed through the fastener hole of the stator and the end plate hole with which the tab hole is aligned securely holds the tab between the stator and end plate. In this manner, the ground connector provides an electrically conductive ground connection between the stator and the end plate. Furthermore, with the ground connector securely held in the terminal block, the ground connector tab hole is held in alignment with the stator fastener hole and the end plate fastener hole by the terminal block being attached to the stator. Thus, the construction of the terminal block and the ground connector simplifies the prior art connection of a ground connector to an electrical device and also provides for automated assembly of the ground connector to the electrical device.

BRIEF DESCRIPTION OF THE DRAWINGS

Further objects and features of the invention will be revealed in the following detailed description of the preferred embodiment of the invention and in the drawing figures wherein.

DETAILED DESCRIPTION OF THE PREFERRED EMBODIMENTS

FIGS. 3 through 6 show an assortment of views of the ground connector 54 of the present invention. In the preferred embodiment of the invention the ground connector 54 is stamped or formed from a single, monolithic piece of metal having good electrically conductive properties. From the stamped blank of metal the ground connector is formed with an intermediate length or span 56 having opposite proximal 58 and distal 60 ends. The proximal end 58 is that closest to the terminal block and the distal end 60 is that closest to the connection to the motor stator 30 and end plate 14 as will be explained. The ground connector intermediate span 56 has opposite front 62 and back 64 surfaces that are flat, and in particular the front surface 62 is flat to lay flush against a back surface of the terminal block as will be explained.

Figures 4, 5, 6:
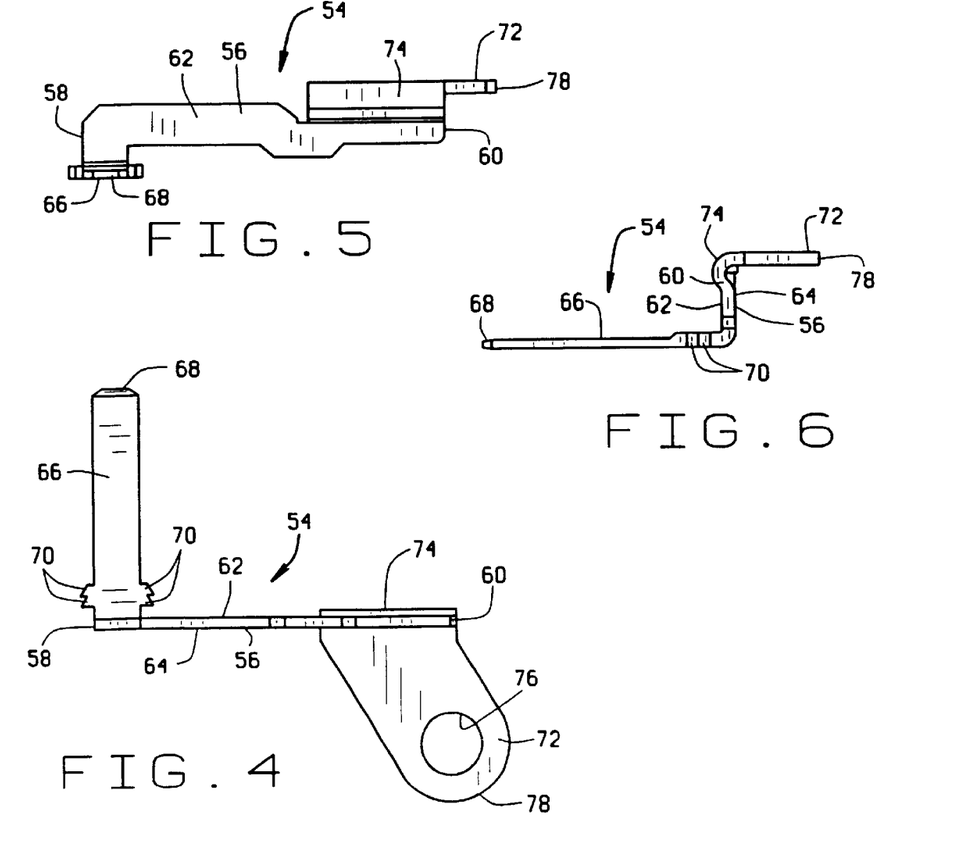
FIG. 4 is a bottom plan view of the ground connector.
FIG. 5 is a front elevation view of the ground connector.
FIG. 6 is a side elevation view of the ground connector.

A connector plug 66 at the proximal end 58 of the span projects perpendicularly from the span. As seen in FIG. 6, the plug 66 is generally flat and is bent outwardly from the proximal end 58 of the intermediate span 56. A distal end 68 of the plug 66 is formed in the conventional manner with tapered surfaces to facilitate receipt of a mating receptacle on the plug. The connector plug 66 has a sufficient length from the span 56 to enable the plug to pass completely through the terminal block with the span front surface 62 resting against the back of the terminal block as will be explained. The plug is formed with opposed pairs of barbs 70 adjacent the connection of the plug to the span 56. The barbs 70 project slightly outwardly from the opposite edges of the plug 66 and are employed in securing the plug to the terminal block as will be explained.

Figure 3:
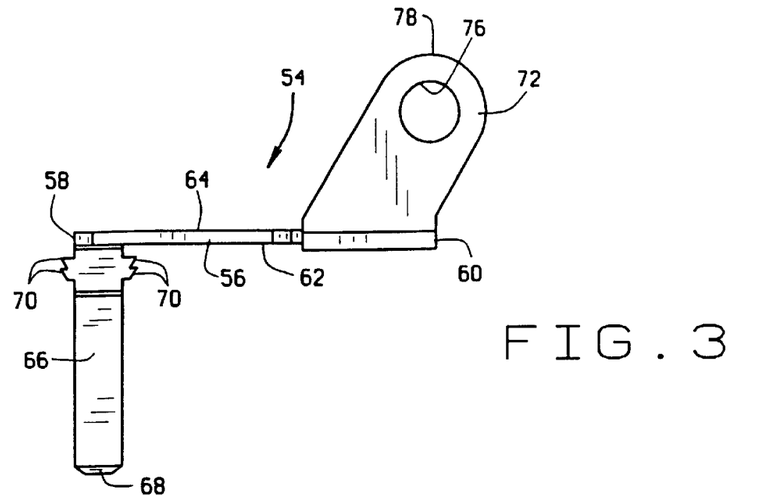
FIG. 3 is a top plan view of the ground connector of the invention.

A grounding tab 72 is formed at the distal end 60 of the ground connector. As seen in FIG. 6, the grounding tab 72 is bent from the distal end 60 of the ground connector so that it projects generally perpendicularly from the back surface 64 of the ground connector span 56. Where the tab 72 connects with the distal end 60 of the ground connector span it is provided with a bend portion 74. The bend portion 74 functions as a spring and enables the ground connecting tab 72 to flex resiliently relative to the intermediate span 56 of the ground connector about the bend portion 74. As seen in FIGS. 3 and 4, the grounding tab 74 extends outwardly from the ground connector span and has a tab hole 76 adjacent a distal end 78 of the tab. The tab hole 76 has an interior diameter that is dimensioned at least as large as the fastener holes 38 of the stator and the fastener holes 40 of the end plate with which the ground connector 54 is to be used.

Figure 7:
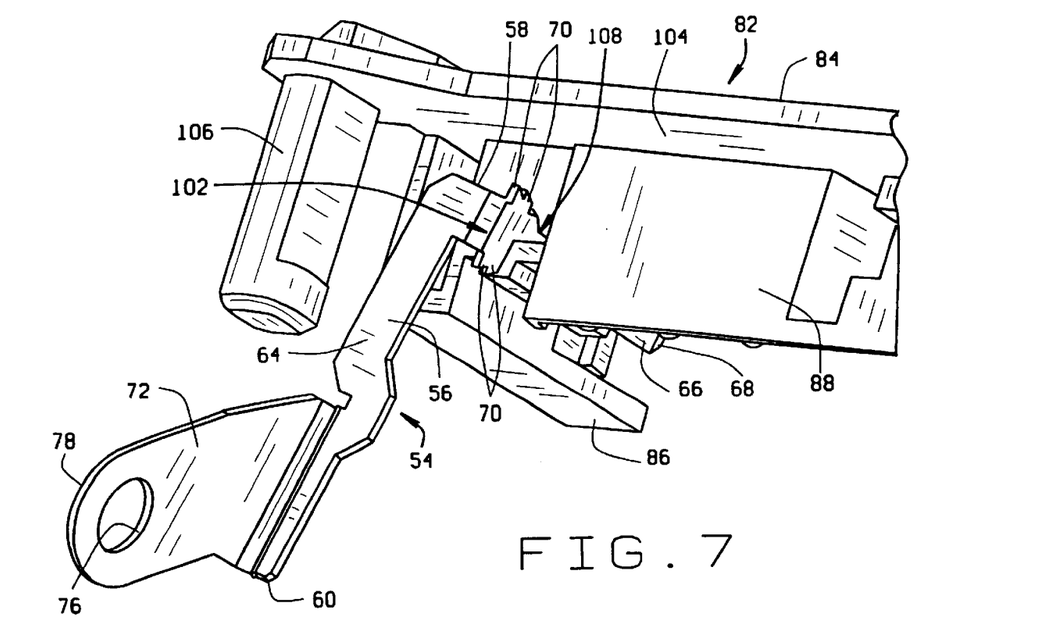
FIGS. 7 and 8 show the terminal block ground connector socket of the invention and illustrate steps in attaching the ground connector of the invention to the terminal block.
Figure 8:
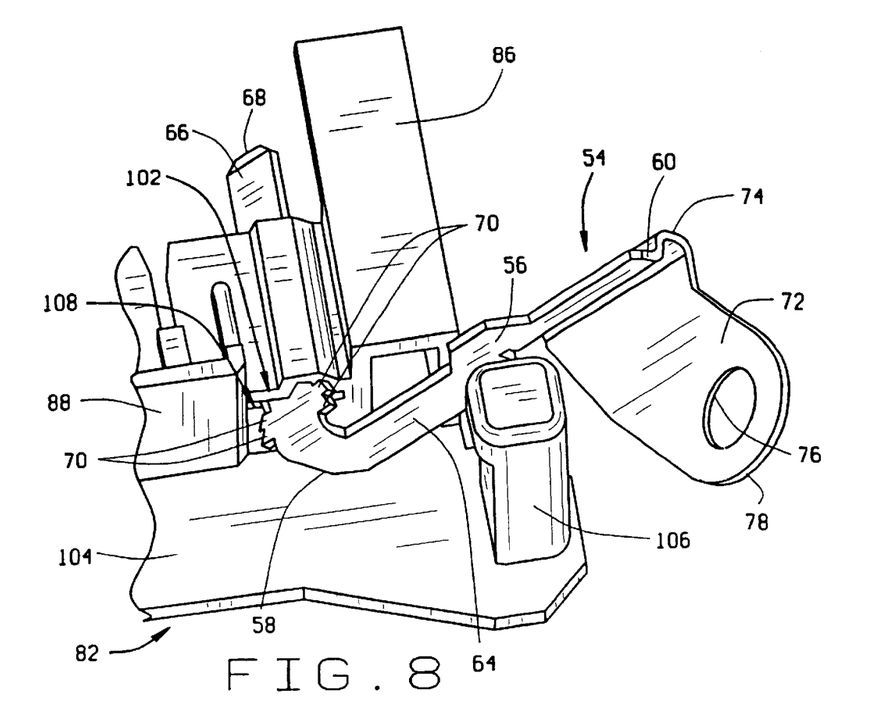
Figure 9:
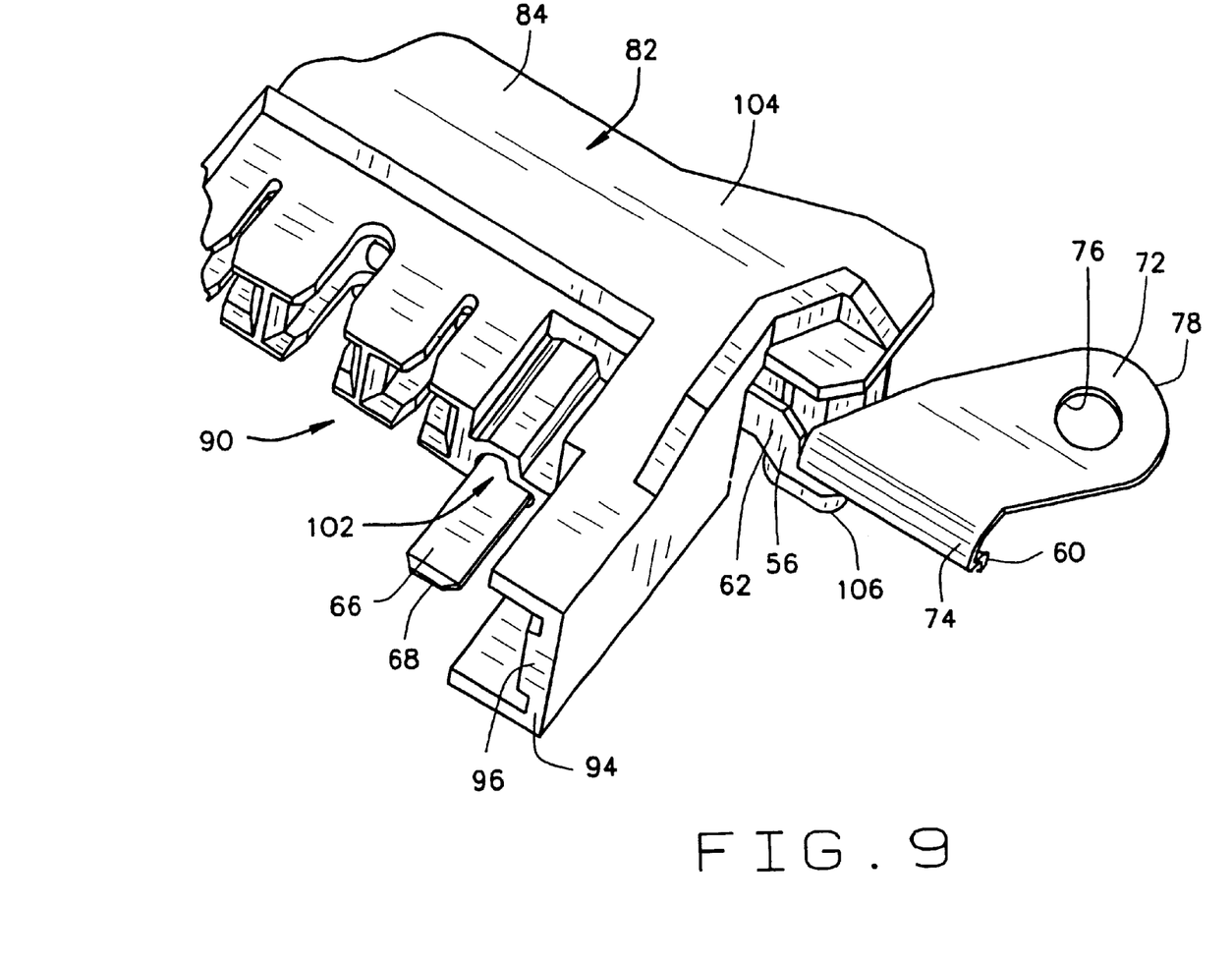
FIG. 9 shows the ground connector of the invention attached to the terminal block.
Figure 10:
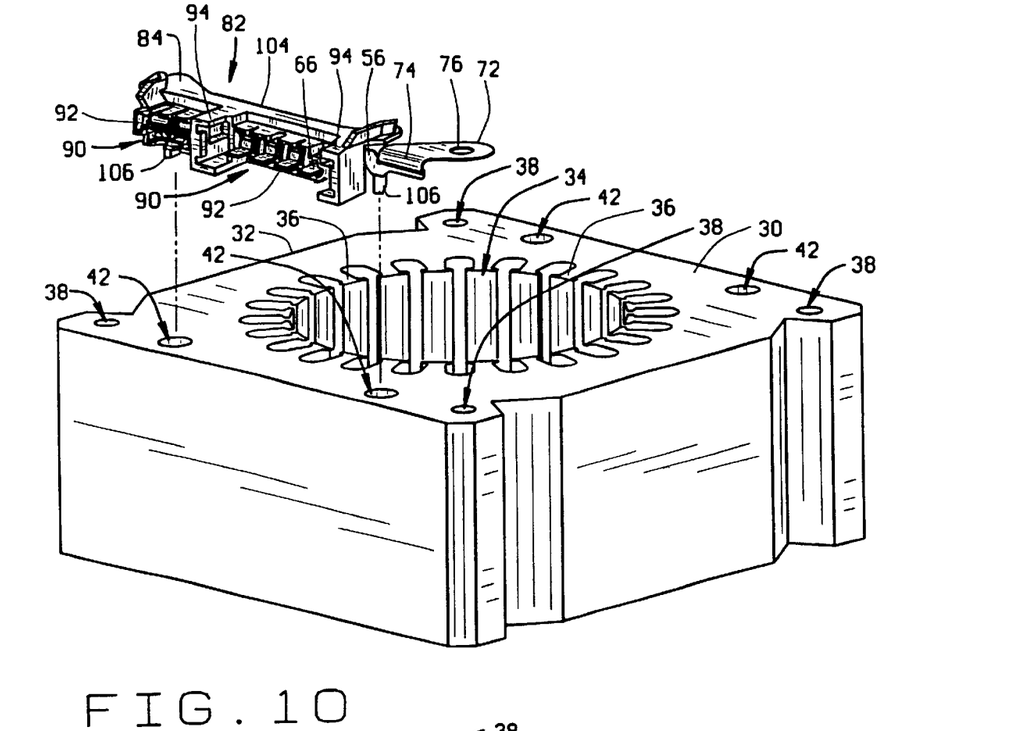
FIGS. 10 and 11 illustrate the assembly of the terminal block and ground connector of the invention to a stator.
Figure 11:
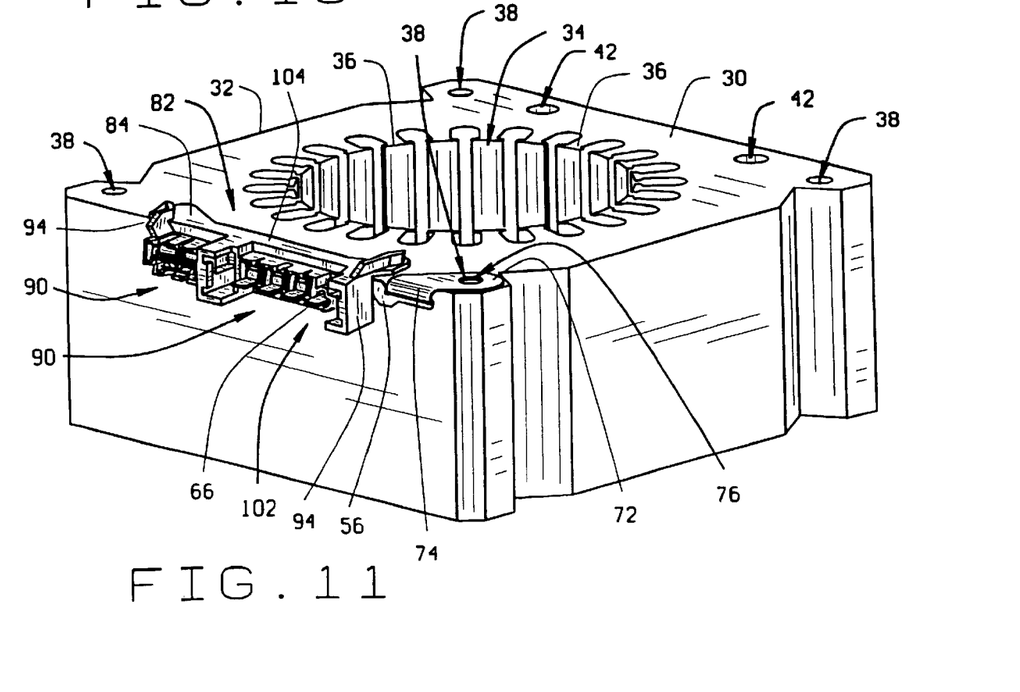
Figure 12:
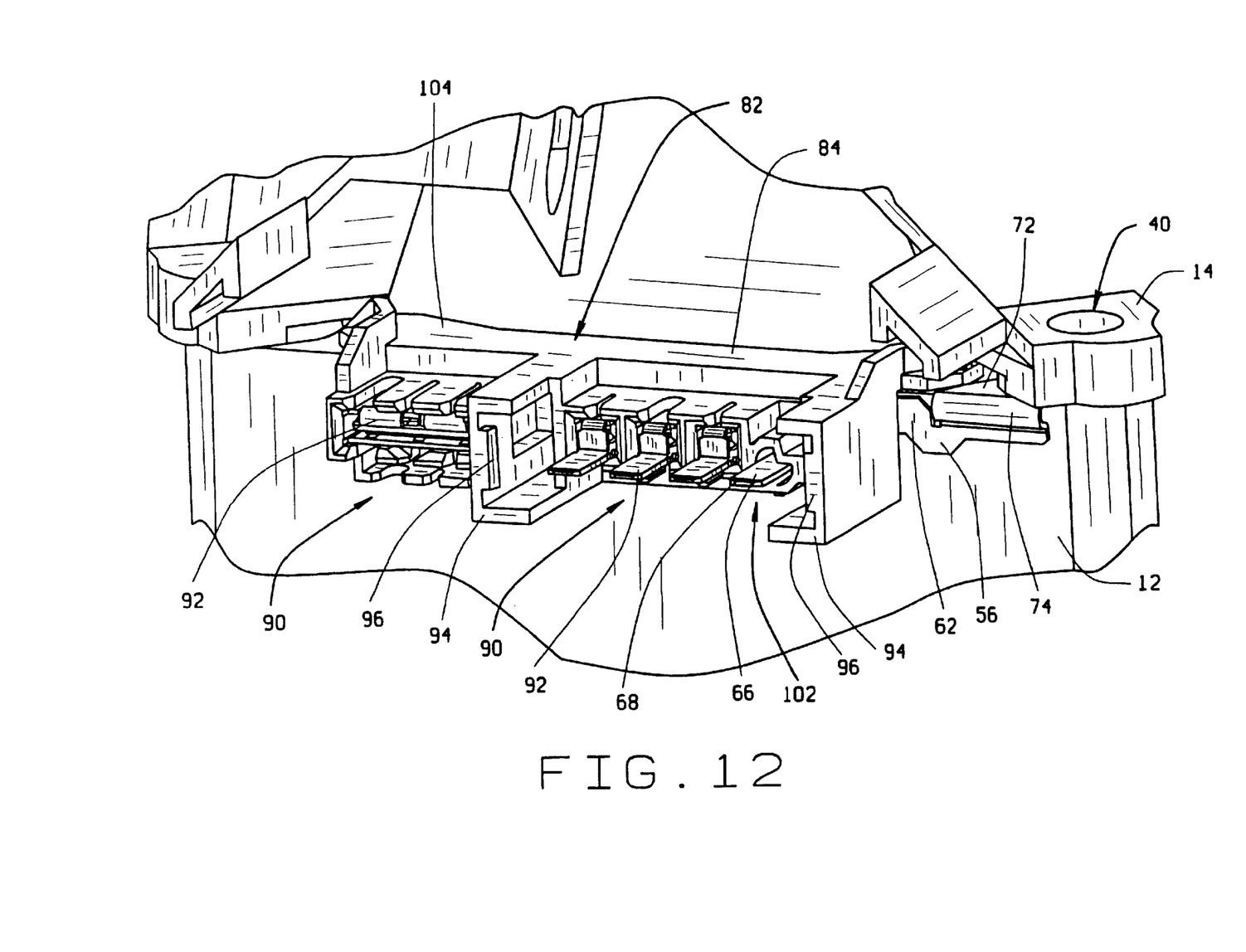
FIG. 12 shows the terminal block of the invention assembled to an electrical device such as the motor shown in FIG. 1.

The terminal block 82 of the invention is shown in FIGS. 10 through 12 and the inventive portion of the terminal block is shown in the partial views of the terminal block of FIGS. 7 through 9. The terminal block of the invention is a modification of the terminal block of the prior art and therefore its overall construction will not be described in detail. The terminal block 82 is constructed of an electrically insulating material and has opposite top 84 and bottom 86 surfaces and a back surface 88. A plurality of plug sockets 90 pass through the terminal block from its back surface 88 to the front of the terminal block. The plug sockets 90 are designed to receive and securely hold various different types of electrical connectors 92 such as those shown in FIG. 12. Also shown in FIG. 12 are a pair of arms 94 with opposed clasps or pawls 96 that are positioned to receive a receptacle plug therebetween and are configured to grasp the receptacle plug inserted between the arms 94. Shown to the right in FIG. 12 is the plug socket 102 and the connector plug 66 of the ground connector 54 of the invention.

The top surface 84 of the terminal block extends rearwardly across the top of an upper ledge 104 that projects from the terminal block back surface 88. Extending downwardly from the upper ledge 104 are a pair of terminal block mounting posts 106. Because the mounting posts 106 extend downwardly from the upper ledge 104 of the terminal block, the terminal block of the invention is mounted on a side of the stator 30 instead of on an end surface of the stator as shown in FIG. 1. The back surface 88 of the terminal block engages against the side of the stator stabilizing the terminal block on the stator. The terminal block back surface 88, the upper ledge 104 and one of the mounting posts 106 of the inventive terminal block 82 can be see in the partial views of FIGS. 7 through 9. The inventive plug socket 102 of the terminal block is also seen in FIGS. 7 through 9 as well as FIG. 12.

The plug socket 102 passes completely through the terminal block 82 from the back surface 88 through to the front of the terminal block. As seen in FIGS. 7 through 9 and 12, the plug socket 102 has a cross-section configuration of a pair of connected, diametrically opposed quarter circles. This configuration is best seen in FIG. 12. This cross-section of the plug socket 102 extends completely through the terminal block 82. However, adjacent the back surface 88 of the terminal block the plug socket 102 is also formed with a recessed slot 108. The recessed slot 108 can be seen in FIGS. 7 and 8. The slot 108 is dimensioned to received the opposed barbs 70 of the ground connector plug 66 with the barbs 70 digging into the material of the terminal block at the opposite ends of the slot 108 to securely hold the barbs and the plug 60 in the plug socket 102 as will be explained.

FIGS. 7 through 9 illustrate the insertion and attachment of the ground connector 54 to the terminal block 82. In the initial insertion of the ground connector, the connector plug 66 is inserted into the socket 102 at the back surface 88 of the terminal block with the plug 66 positioned generally perpendicular to the recessed slot 108. This orientation of the ground connector 54 allows a substantial portion of the connector plug 66 to be inserted through the plug socket 102 without the adjacent terminal block post 106 interfering with the insertion. As can be seen in FIG. 7, a substantial portion of the connector plug 66 can be inserted through the plug socket 102 without the mounting post 106 shown in FIG. 7 contacting the ground connector span 56 and interfering with the plugs insertion. Once the plug 66 is inserted to the extent that is barbs 70 come into contact with the terminal block back surface 88 as shown in FIG. 7, then the ground connector 54 is rotated relative to the terminal block 82 so that the intermediate span or length 56 of the ground connector passes between the terminal block back surface 88 and the adjacent mounting post 106 as shown in FIG. 8. While the ground connector 54 is rotated in this manner the barbs 70 come into alignment with the recessed slot 108. When the barbs 70 are aligned with the recessed slot 108 they are inserted into the slot thereby securely holding the ground connector 54 in the terminal block 82 in the relative positions of the ground connector and terminal block shown in FIG. 9. With the ground connector so assembled to the terminal block, the terminal block 82 can now be assembled to the stator assembly 12 and the particular configuration of the ground connector 54 will position the grounding tab 72 between the stator assembly 12 and the end plate 14 with the tab hole 76 aligned with a stator fastener hole 38 and an end plate fastener hole 40.

FIGS. 10 through 12 illustrate the assembly of the terminal block 82 and the attached ground connector 54 to an electric device such as the motor shown in FIG. 1. As in the assembly of the prior art terminal block to the stator assembly 12, the mounting posts 106 of the terminal block are positioned over the mounting post holes 42 of the stator. The mounting posts 106 are then inserted into the stator post holes 42 until the terminal block upper ledge 104 rests against the end surface of the stator onto which the end plate is to be mounted. This attachment of the terminal block 82 to the stator 12 properly positions the grounding tab 72 over the surface of the stator with the tab hole 76 aligned with a stator fastener hole 38 as shown in FIG. 11. When the end plate 14 is positioned against the end surface of the stator assembly 12, the end plate fastener hole 40 that aligns with the stator fastener hole 38 also aligns with the tab hole 76 as shown in FIG. 12. When a bolt 26 connector is then inserted through the aligned end plate fastener hole 40 and stator fastener hole 38 it also passes through the tab hole 76 of the ground connector. Securing the bolt 26 with a nut 28 as was done in the prior art assembly of the electric device provides the grounding connection between the grounding tab 72 of the ground connector 54 and the stator assembly 12 and end plate 14.

The ground connector 54 and terminal block 82 of the invention provide a grounding system in which the need to manually hold a grounding tab relative to a stator and end plate of an electric device as the stator and end plate are assembled together is eliminated. The grounding system of the invention facilitates the manual assembly of a ground connector to an electrical device and also enables automated assembly of the ground connector to the electrical device.

While the present invention has been described by reference to specific embodiments, it should be understood that modifications and variations of the invention may be constructed without departing from the scope of the invention defined in the following claims.

What is claimed:

1. A grounding system for an electric device comprising:

a stator having a plurality of fastener holes;

a terminal block having a plug hole through the terminal block and a post projecting from the terminal block, the terminal block being attached to the stator; and a ground connector mounted on the terminal block, the ground connector having a length with a tab at one end of its length and a plug at an opposite end of its length, the tab having a tab hole that aligns with one of the stator plurality of fastener holes, the plug of the ground connector passing through the plug hole to project from the terminal block whereby a receptacle may be mounted on the plug, the length of the ground connector passing between the terminal block and the post whereby the post prevents the plug of the ground connector from backing out of the plug hole.

2. The grounding system of claim 1, wherein:

the stator has a post hole and the terminal block is attached to the stator by the post extending into the post hole.

3. A grounding system for an electrical device having a stator with a plurality of fastener holes, the grounding system comprising:

a terminal block constructed of an electrically insulating material and adapted for attachment to the stator, the terminal block having a plug hole through the terminal block and a post projecting from the terminal block; and a ground connector constructed of an electrically conductive material, the ground connector having a length with a tab at one end of its length and a plug at an opposite end of its length, the plug of the ground connector being mounted on the terminal block and passing through the plug hole, the ground connector plug projecting from the terminal block whereby a receptacle may be attached to the plug, the length of the ground connector positioning the tab relative to the terminal block where the tab will engage with the stator when the terminal block is attached to the stator, the length of the ground connector passing between the terminal block and the post whereby the post prevents the plug of the ground connector from backing out of the plug hole.

4. A grounding system for an electric device comprising:

a stator;

at least one end plate that is secured to the stator;

a terminal block that is secured to at least one of the stator and end plate, the terminal block having opposite front and back surfaces, opposite top and bottom surfaces, opposite side surfaces and at least one plug hole that passes through the terminal block between the front and back surfaces; and a ground connector with an intermediate span, the intermediate span having a length with opposite proximal and distal ends and opposite front and back surfaces extending the length of the span between the opposite proximal and distal ends, a connector plug projecting from the proximal end of the span through the terminal block plug hole thereby mounting the ground connector on the terminal block with the span front surface extending across and opposing the terminal block back surface and projecting outwardly from one of the terminal block side surfaces to the span distal end that is spaced outwardly from the one terminal block side surface.

5. The grounding system of claim 4, further comprising:

a grounding tab at the intermediate span distal end projecting outwardly from the intermediate span back surface.

6. The grounding system of claim 4, further comprising:

the intermediate span back surface opposes the stator.

7. The grounding system of claim 4, further comprising:

the connector plug projects outwardly from the intermediate span front surface at an angle relative to the front surface and a grounding tab projects outwardly from the intermediate span back surface at an angle relative to the back surface.

8. The grounding system of claim 4, further comprising:

the connector plug has a bend that extends along a portion of the length of the intermediate span and connects the connector plug to the intermediate span proximal end; and a grounding tab projects from the distal end of the intermediate span, the grounding tab has a bend that extends along a portion of the length of the intermediate span and connects the grounding tab to the intermediate span distal end.

9. The grounding system of claim 8, further comprising:

the connector plug bend positions the connector plug projecting outwardly from and at an angle relative to the intermediate span front surface and the grounding tab bend positions the grounding tab projecting outwardly from and at an angle relative to the intermediate span back surface.

10. The grounding system of claim 8, further comprising:

the intermediate span has a width across its length and the connector plug bend and the grounding tab bend are on opposite sides of the intermediate span width.

11. The grounding system of claim 4, further comprising:

the one plug hole of the terminal block is one of a plurality of plug holes that pass through the terminal block between the front surface and back surface and are arranged side by side between the opposite side surfaces of the terminal block.

12. A grounding system for an electric device comprising:

a stator;

at least one end plate that is secured to the stator, the end plate having a fastener hole for receiving a fastener;

a terminal block that is secured to at least one of the stator and the end plate;

a ground connector mounted on the terminal block, the ground connector having a length with opposite proximal and distal ends, a connector plug projecting from the proximal end of the connector through the terminal thereby mounting the connector on the terminal block, and a grounding tab with a fastener hole projecting from the distal end of the connector to a position where the tab fastener hole is aligned with the end plate fastener hole to receive the fastener received in the end plate fastener hole; and, the ground connector having an intermediate span with opposite front and back surfaces that extend the length of the ground connector between the opposite proximal and distal ends, and the connector plug projects outwardly from the span front surface at an angle relative to the front surface and the grounding tab projects outwardly from the span back surface at an angle relative to the back surface.

13. The grounding system of claim 12, further comprising:

the intermediate span front surface opposes the terminal block and the intermediate span back surface opposes the stator.

14. The grounding system of claim 12, further comprising:

the connector plug has a bend that extends along a portion of the length of the intermediate span and connects the connector plug to the intermediate span proximal end; and the grounding tab has a bend that extends along a portion of the length of the intermediate span and connects the grounding tab to the intermediate span distal end.

15. The grounding system of claim 14, further comprising:

the intermediate span has a width across its length and the connector plug bend and the grounding tab bend are on opposite sides of the intermediate span width.

16. The grounding system of claim 12, further comprising;

the terminal block having opposite front and back surfaces, opposite top and bottom surfaces and opposite side surfaces, and the intermediate span front surface opposes and extends across the terminal block back surface and projects outwardly from one of the terminal block side surfaces to the intermediate span distal end that is spaced outwardly from the one terminal block side surface.

17. A grounding system for an electric device comprising:

a stator;

at least one end plate that is secured to the stator, the end plate having a fastener hole for receiving a fastener;

a terminal block that is secured to at least one of the stator and the end plate;

a ground connector mounted on the terminal block, the ground connector having a length with opposite proximal and distal ends, a connector plug projecting from the proximal end of the connector through the terminal block thereby mounting the connector on the terminal block, and a grounding tab with a fastener hole projecting from the distal end of the connector to a position where the tab fastener hole is aligned with the end plate fastener hole to receive the fastener received in the end plate fastener hole; and, the terminal block having opposite front and back surfaces, opposite top and bottom surfaces, opposite side surfaces and a plurality of plug holes that pass through the terminal block between the front and back surfaces and are arranged side by side in the terminal block between the terminal block side surfaces, and the connector plug passes through one of the plurality of plug holes thereby mounting the ground connector on the terminal block with the grounding tab projecting outwardly from the terminal block back surface positioning the tab fastener hole outwardly from and behind the terminal block back surface.

* * * * *